US008874562B2

(12) United States Patent
Yennie

(10) Patent No.: US 8,874,562 B2
(45) Date of Patent: Oct. 28, 2014

(54) TIME-ADDRESSED DATABASE MANAGEMENT SYSTEM

(76) Inventor: Clark Yennie, West Tisbury, MA (US)

(*) Notice: Subject to any disclaimer, the term of this patent is extended or adjusted under 35 U.S.C. 154(b) by 79 days.

(21) Appl. No.: 11/809,878

(22) Filed: Jun. 1, 2007

(65) Prior Publication Data

US 2008/0091704 A1 Apr. 17, 2008

Related U.S. Application Data

(63) Continuation of application No. 11/059,293, filed on Feb. 16, 2005, now abandoned.

(60) Provisional application No. 60/545,452, filed on Feb. 18, 2004.

(51) Int. Cl.
*G06F 7/00* (2006.01)
*G06F 17/30* (2006.01)

(52) U.S. Cl.
CPC .... *G06F 17/30592* (2013.01); *G06F 17/30327* (2013.01); *G06F 17/30551* (2013.01); *G06F 17/30333* (2013.01)
USPC .......................................................... 707/725

(58) Field of Classification Search
CPC .......... G06F 17/30073; G06F 11/1461; G06F 17/30011; G06F 11/1451; G06F 17/30
USPC ......... 707/10, 203, 8, 694, 649, 703, 38, 665, 707/725; 705/38
See application file for complete search history.

(56) References Cited

U.S. PATENT DOCUMENTS

| | | | | |
|---|---|---|---|---|
| 5,893,117 | A * | 4/1999 | Wang | 707/203 |
| 6,122,645 | A * | 9/2000 | Bohannon et al. | 1/1 |
| 6,584,477 | B1 * | 6/2003 | Mosher, Jr. | 707/610 |
| 6,625,602 | B1 * | 9/2003 | Meredith et al. | 707/703 |
| 6,754,657 | B2 * | 6/2004 | Lomet | 707/8 |
| 7,562,367 | B1 * | 7/2009 | Arad | 719/318 |
| 2003/0093429 | A1 * | 5/2003 | Nishikawa et al. | 707/10 |
| 2003/0131008 | A1 * | 7/2003 | Paulin | 707/100 |
| 2004/0191745 | A1 * | 9/2004 | Takano et al. | 434/322 |
| 2005/0278296 | A1 * | 12/2005 | Bostwick | 707/1 |
| 2006/0074793 | A1 * | 4/2006 | Hibbert et al. | 705/38 |
| 2006/0143232 | A1 * | 6/2006 | Ernst et al. | 707/104.1 |

OTHER PUBLICATIONS

"Cache 5" Cache Technology, 4 pages.
"Cache Components" Unified Data Architecture, 4 pages. (2001).
"Cache Technology Guide" InterSystems Cache: Make Applications Faster, 49 pages. (2003).
International Search Report, International Application No. PCT/US2005/04783, mailed Nov. 22, 2006 (2 pgs).

(Continued)

*Primary Examiner* — Truong Vo
(74) *Attorney, Agent, or Firm* — Wilmer Cutler Pickering Hale and Dorr LLP

(57) ABSTRACT

A method of constructing a database for a database application, the method involving for each of a plurality of transactions, receiving input from a user via the database application; constructing a corresponding record that embodies the received input for that transaction; appending a time address to the corresponding record for that transaction, wherein the time address identifies when the corresponding transaction was completed; and storing the corresponding record for that transaction in a non-volatile data storage, wherein the time address for that corresponding record is permanently associated with that stored corresponding record and wherein the database application during normal operation prevents any overwriting of that stored corresponding record with any other record.

12 Claims, 5 Drawing Sheets

(56) References Cited

OTHER PUBLICATIONS

Gray et al. "Transaction processing: concepts and techniques (excerpt), passage" Jan. 1, 1993. Transaction Processing: Concepts and Techniques, pp. 373-445.
Stonebreaker, M. "The design of the POSTGRES storage system" Proceedings of the Thirteenth International Conference on Very Large Databases: 1987 13th VLDB Morgan Kaufman Los Altos, CA, USA, 1987, pp. 1-19.
Stonebreaker, M. "The Postgres next-generation database management system" Communications of the Association for Computing Machinery, ACM, New York, NY, US vol. 34, No. 10, Oct. 1, 1991 pp. 78-92.
Supplementary European Search Report, European Patent Application No. 05713596.4, mailed Jan. 19, 2009 (4 pages).

* cited by examiner

TIME-ADDRESSED DATABASE MANAGEMENT SYSTEM

This application is a continuation of U.S. application Ser. No. 11/059,293 filed Feb. 16, 2005, which claims the benefit of provisional Application No. 60/545,452, filed Feb. 18, 2004.

TECHNICAL FIELD

This invention relates to database programs and data structures.

BACKGROUND OF THE INVENTION

A fundamental design principle of modern database theory is that updates to database tables are not dated and they overwrite previous data, erasing previous entries.

Relational database design theory is based on the principle of breaking down data into its most elemental parts and storing these in many tables. Thus, for example, the data used in an order entry system may be spread over many tables, and a transaction in such a system, as might result from the processing of a new order, will typically require updating many rows in many tables. On-Line Transaction Processing (OLTP) systems attempt to encapsulate these multi-record updates as "transactions", but they are not always able to do so. In a multi-user environment, multiple users or processes may compete for access to the same rows in the same tables, resulting in deadlocks and rollbacks that prevent the database from processing all updates and in a timely and responsive fashion.

SUMMARY OF THE INVENTION

A problem with all transaction processing systems is that they involve multiple records. It has been the accepted view that multiple records are needed because different applications work with different results of transactions. Accounts receivable statements, for example, are only interested in the billing aspects of transactions, not the inventory aspects. Therefore, billing information is typically stored in one file, while inventory information is stored in another. In fact, a typical transaction will update many different files, each intended to support a different set of output functions.

In addition, traditional systems are designed around an implicit assumption of a severe space constraint, and therefore they are designed to keep only one version of each record. All modern databases support variable-length records, which means that when a record is updated, it may not fit in the same place. Records must be shuffled around, tables of leftover spaces must be maintained, and search algorithms must be designed to try to reuse space efficiently without wasting too much space or too much performance.

The database systems described herein are based on a different paradigm from the one that prevails today among database designers. As a consequence, they require none of this complex software that is currently needed for OLTP systems.

The database system described herein has at least three cooperating features that jointly solve a broad spectrum of problems that exist with current database designs. The three features are a time-addressed database; drill-down indexes, and automated summary buckets. In general, the time-addressed database eliminates the problems of data warehousing and large read-only transactions. However, it is not a complete solution to transaction processing because it does not by itself address update transactions. In fact, it makes update transaction processing somewhat more complex. The addition of drill-down indexes to the document processing system solves the transaction update problem. But it leaves the summary bucket problem not fully cured. The third aspect, namely, automated summary buckets, takes care of that problem. Though these three features are designed to work together in an integrated database system, any of these features could be applied separately to an existing database and be useful.

In general, in one aspect the invention features a method of constructing a database for a database application, the method involving for each of a plurality of transactions, receiving input from a user via the database application; constructing a corresponding record that embodies the received input for that transaction; appending a time address to the corresponding record for that transaction, wherein the time address identifies when the corresponding transaction was completed; and storing a copy of the corresponding record for that transaction in a non-volatile data storage, wherein the time address for that corresponding transaction is permanently associated with that version of that stored corresponding record and wherein the database application during normal operation prevents any overwriting of that version of that stored corresponding record.

Other embodiments include one or more of the following features. The method also includes, for each of the plurality of transactions, adding a primary key to the corresponding record. For all transactions handled by the database application, a record may be retrieved from the database and updated or a new record may be created. Storing the corresponding new version of the record involves adding that version of that corresponding record to a file in the non-volatile data storage. More specifically, it involves appending that version of that corresponding record to the end of its corresponding file. The method also involves responding to a command to delete a particular one of the stored records by: generating a new version of the stored record; flagging the new version of the stored record as deleted; adding a time address to the new version of the stored record, and storing the new version of the stored record in the non-volatile data storage while continuing to leave prior versions of said particular record in the non-volatile data storage. Also, the method includes generating and maintaining a plurality of indexes to information that is within the stored records.

For every record, one primary key is provided by the application. A primary index is based on this key. For each primary key in the primary index, there are two corresponding lists. The first list contains the time addresses of all of the versions of that record stored in the non-volatile storage. The second list contains the storage addresses of all of the versions of that record stored in the non-volatile storage. As each new version of that record is added to the non-volatile storage, the time address of that version is appended to the end of the first list and the storage location of that version is appended to the end of the second list. Keys for each of the plurality of additional indexes are extracted and composed from data contained within the record and the primary key. Each of those keys are based on two parts, the first of which is an alternate key based on information stored in the record, and the second part of which is the primary key of the stored record. For each instance of the two-part key, there is a list of boolean (true or false) values which indicates which versions of the record corresponding to the primary key are versions containing the alternate key. The secondary indexes may contain more than one indice with the same alternate key, but only one indice with the same two part alternate key and primary key.

In general in another aspect, the invention features a database method involving storing a plurality of records in a data storage, wherein each of the records of the plurality of records has a common structure that is characterized at its highest level by a key:value pair map in which, for each key:value pair, the values may be a scalar, a list of values, or a key:value pair map, and each value in each list or key:value pair map may, in turn, be a scalar, a list of values, or a key:value pair map, and so on to an unlimited number of levels, and the key:value pair maps may be used to represent one or more sub-records within the record; and generating and maintaining a plurality of drill-down indexes, wherein each of the plurality of drill-down indexes is based on a corresponding multipart key and is for extracting information from the corresponding sub-records contained with the records of the plurality of records.

Other embodiments include one or more of the following features. The storing of the plurality of records involves adding a time address to each version of each of the plurality of stored records, wherein the time address identifies when the corresponding version of the corresponding record was created and wherein the primary indexes to said stored records contain the time addresses of said stored records and a plurality of alternate indexes contain in each indice the primary key and a list of boolean (true or false) values indicating which versions of the corresponding record contain the corresponding alternate key.

In general, in still another aspect, the invention features a method of maintaining summary information for a database application that manages a database of records, the method including constructing an index for a key having associated therewith one or more quantity-related attributes that are found in the database records, wherein for each different instance of the key the index maintains a summary bucket that contains a cumulative value that is the sum of all values for the one or more quantity-related attributes associated with that instance of the key; and automatically updating the summary buckets in the index each time a new record is added to the database.

Other embodiments include one or more of the following features. The automatic updating involves, whenever a new record is added, scanning the new record for instances of attributes that match the summary bucket definitions for that file; extracting values associated with those instances; and adding the extracted values to the appropriate summary buckets stored in the index.

Other embodiments include one or more of the following features. One or more of the indexes may be stored in volatile memory. When the memory is erased, the indexes are rebuilt by scanning the plurality of records in the database and rebuilding said indexes.

The details of one or more embodiments of the invention are set forth in the accompanying drawings and the description below. Other features, objects, and advantages of the invention will be apparent from the description and drawings, and from the claims.

DETAILED DESCRIPTION

Time-Addressed Database

One of the most fundamental principles of accepted accounting practice is that all postings to a set of books or records are dated and appended in chronological order. No entry is ever erased or altered. Even though the primary use of computer database management systems is for the maintenance of accounting books and records, a fundamental design principle of modem database theory is that updates to database tables are not dated and they overwrite previous data, erasing previous entries.

The embodiments described herein manage data in a manner that is much more consistent with the accounting model. Each row (i.e., record) in a table (i.e., file) may have many versions, and all of the versions are part of the database. Rows in the database are accessed by key and time address, rather than just key. In other words, each version of each record is identified by a time representing the time at which that version of that record was created.

Figure 1:
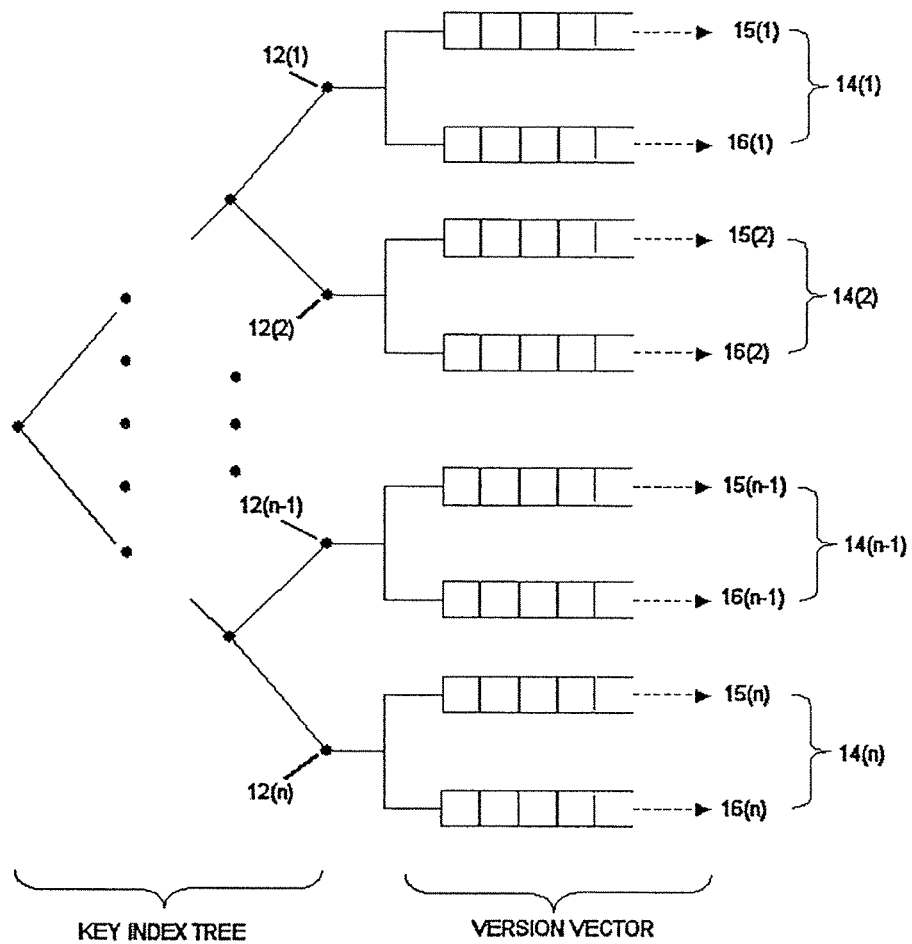
FIG. 1 illustrates the tree and list structure that is used to implement the primary index to the database.

Referring to FIG. 1, the described embodiment uses a tree and list structure to implement the primary index to the database. The highest level of the index is sorted by key. Each node $12(1) \ldots 12(n)$ of this tree contains pair of lists 14. The first list 15 contains the time addresses of all the versions of the record in non volatile storage, in the order which they were added to secondary storage. The second list 16 contains the storage addresses in non volatile storage where each corresponding version is stored.

When the application looks for a record based on its primary key, it searches through the first tree to find a key match. When a key match is found, the. The leaf node found contains the time address and storage addresses of all of the versions of the record that satisfy the key match.

Figure 2:
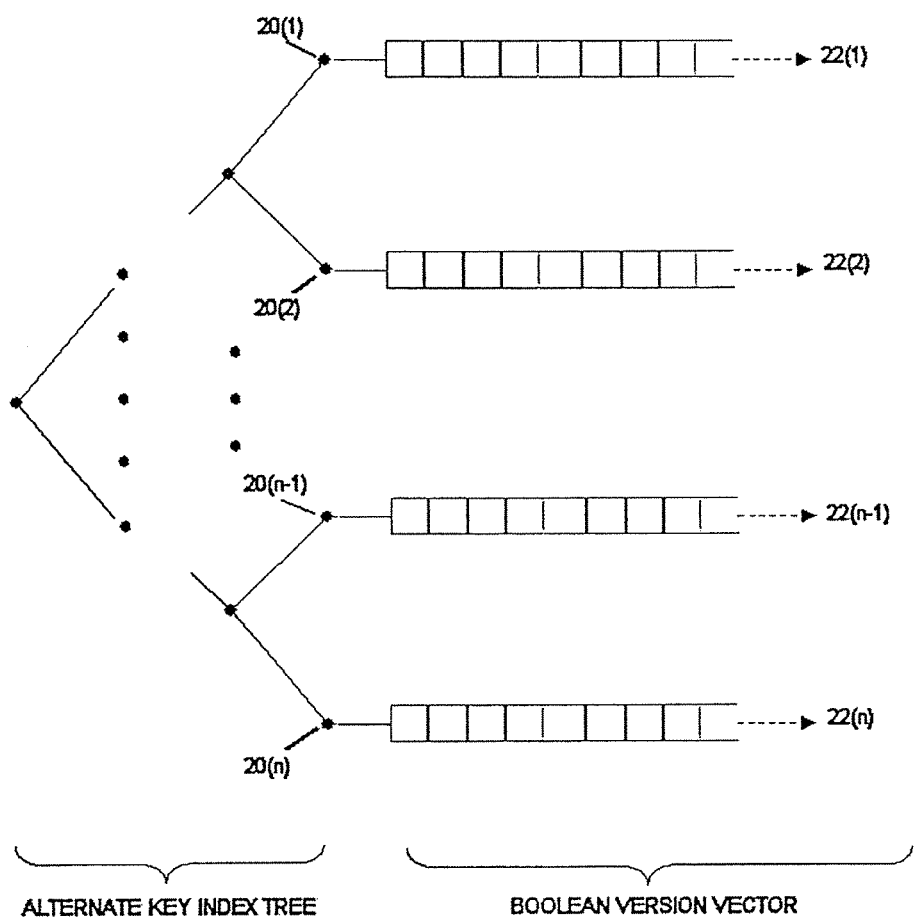
FIG. 2 illustrates the tree and list of boolean (true or false) values structure that is used to implement the alternate indexes to the database.

Referring to FIG. 2, the described embodiment uses a tree and list of boolean (true or false) values structure to implement the alternate indexes to the database. The highest level of the index is sorted by alternate key and primary key. Each node $20(1) \ldots 20(n)$ of this tree contains a list of boolean values $22(1) \ldots 22(n)$ corresponding to the pair of lists in the corresponding primary key leaf node 14. A value of true in this list indicates that this alternate index occurs at least once in the corresponding version of the corresponding record. A value of false indicates that this alternate index does not occur in the corresponding version of the corresponding record. In the event that the pair of lists the primary key leaf node 14 is larger than the list of booleans in a corresponding alternate key leaf node, the values of the missing booleans in the alternate key leaf node are considered to be false.

Other structures could be used in place of trees in the indexes. The tree and list structures, however, closely reflect the architecture of the index-mapping concept that provides time addressability. The same result could be accomplished with single-level tress and multi-part keys consisting of keys and time addresses.

When the application looks for a record, it searches through the tree to find a key match. When the search is by primary key and a key match is found, the leaf node found contains the time address and storage addresses of all of the versions of the record that satisfies the key match. When the search is by alternate key and a key is found whose first part matches the sought alternate key, the primary key is extracted from the second part of the key found and this is used to extract the list pair from the primary key index. The boolean list in the leaf node of the alternate key index is compared to the list pair from the primary key index to determine which versions of the record contain the alternate key that was found.

To search for data or information within the database, a time address can be specified in a search request. If a time address is specified (e.g. $t_{desired}$), the application looks for the closest time address that is $\leq t_{desired}$ and, in the case of an alternate index, for which the desired key exists in the corresponding version. In that case, the database appears to the application and to the user as it was at that specified moment in time. However, if a time address is not specified, the application accesses the most current version, and the database works like a conventional database, with a constantly changing "current" state. Thus, the database described herein serves the dual roles of database and continuous, time-addressable data warehouse.

In the described embodiment, the granularity of the time address is one second though this is a parameter that can be set to other values depending on the performance that is desired. Given the one-second granularity, it is possible that there will be more than one version for any given time stamp. If multiple versions of a record exist, the application will pick the most current version in that time period.

In this database system, a record deletion is actually a new version of a record, flagged as "deleted". When the database is accessed using the key and time address of a deleted version, the result is the same as if the record did not exist, although at a previous time address the record would exist. A more current version of the record could also exist in a non-deleted state. In other words, the concept of "deletion" is merely a matter of state and does not mean that a record has been removed from the database.

The database may be "purged" from time to time to remove versions of records that are no longer needed. This can be done by simply copying records from one physical file to another, omitting non-current versions that precede the cutoff date, although other methods could be employed, including shuffling records "in-place" in a given file. The preferred approach is the simplest one.

Database time addressing is to be distinguished from record versioning. Different invoices have different time addresses; therefore, the database has many versions, even if each invoice has only one version. Time addressing is primarily for accessing past versions of the entire database, as opposed to past versions of individual records, though it also works for the latter.

An individual record that would benefit from versioning is a customer record. A customer may move to a different tax jurisdiction, for example, but the tax jurisdiction applicable to each invoice in that customer's history is dependent on the tax jurisdiction he lived in at that time. If the taxing authority asks for an audit, it can be very helpful to have access to the correct shipping and billing address for each customer as it was at the date of each invoice. This concept also applies to marital status, name, and other customer attributes, as these apply to income taxes, employee benefits, etc.

Time addressing does not automatically solve every problem, but it maintains enough information so that many problems can be solved. A database should reflect the fact that even "static" data changes over time. This approach is much simpler than forcing the application software to maintain historical records.

The Single Transaction Record

An important characteristic of modern relational database systems is that list-like attributes of records are stored in separate tables. For example, when each customer is represented by a single master record but each customer may have multiple shipping addresses, phone numbers, and similar data, the multiple values of those attributes are stored as separate rows in separate tables, with multi-part keys consisting of the primary key to the corresponding customer row and other parts sufficient to give each row in each separate table a unique key. This approach has the distinct disadvantage of requiring multiple tables to be maintained in synchronization. There is no requirement in relational database theory, however, that prevents detail records from being stored hierarchically within other records; the practice of using separate tables is more an artifact of earlier database limitations than a reflection of relational database theory. The described embodiment maintains relational integrity and functionality without the separate tables or the problems associated with updating transactions consistently, atomically and in isolation from other transactions when multiple tables are involved. The drill-down indexes replace the separate indexes of the separate tables, threading together the sub-records contained within the records of one file so that they can be accessed as if they existed in a separate table. The fact that they cannot be updated individually, however, but only as part of the containing record, is an advantage rather than a disadvantage, as this requirement enforces both transactional and referential integrity.

A time-addressed database makes multi-record transaction updates more difficult. Unless all of the updates have the same timestamp, the database could be accessed at a time address that splits a transaction into two parts. Forcing all of the records in a transaction to have the same timestamp solves this problem, but introduces another problem. When two or more transactions overlap in time—that is, when one begins before another finishes—it is possible that the same record could be updated by both transactions, but the transaction with the later timestamp might update the record first. This would result in the versions being out of timestamp sequence.

This can happen with conventional databases as well, but for them it is a fleeting anomaly. For a time-addressed database, it becomes a permanent artifact because as a rule all versions of all records are addressable by time address. In order for transactional data in a time-addressed database to be consistent, all transactions must be fully serialized, which puts a heavy burden on the system and the programmer. The described embodiment solves this additional problem by eliminating multi-record transactions.

An insight that underlies the database system described herein is the recognition that as a rule all information that is needed to support the functionality of the particular database application is associated with or comes from a document (or a group of a limited number of document types) that is defined or can be defined for that database application. This is particularly apparent for business applications in which an invoice transaction document is a good example. Within the invoice transaction document, one can organize the data that is typically associated with such a document into "sub-records," some of which contain billing information and others of which contain inventory information. Thus, the most efficient way to handle the data or information in the application is to put it in one record rather than to spread it out among many different tables as is currently done in database applications. All necessary information for that particular transaction can then be extracted from that single record.

Examples of other documents that might have relevance in business database context besides an invoice are the purchase order, the payroll document, and the accounting document. Indeed, it might be useful to employ multiple document types in a database application, each represented by a record type having its own hierarchical structure of sub-records, but with different documents having similar sub-records in common. These sub-records could be indexed by a common index, thereby allowing similar data from multiple documents to be combined for such purposes as reporting and analysis. Thus there would be different record types in single file. To distinguish one record type from another a prefix could be added to the primary key for the record.

The described embodiment replaces the many-table design with a design based on a minimal set of tables. In particular, there are a minimal number of transaction files for any given database application, and all of the details of any given update transaction, as defined for that application, are embodied in a single record that represents a "document" that is the interface or mechanism for the update transaction. The specification of the document depends on the particular database application and the particular functionality that the database application needs to provide. So, theoretically, depending on the details of the database application, a document can be very large and very complex. Thus, the record that will embody the contents of any potential document must have a structure that enables it to be of any arbitrary size and complexity.

The record structure to be described now satisfies those requirements. It is one that is capable of storing records within records in a hierarchical manner, and for which one can define indexes that can drill down into records to extract sub-records. So, for example, continuing with the invoice example mentioned above, the record could be designed to contain billing sub-records and inventory sub-records. In that case, there might be one drill-down index that is used to extract the billing sub-records by customer key and date and another drill-down index that is used to extract inventory sub-records by product key and date. So, the record structure along with the associated drill-down indexes serve multiple functions, but the transaction is updated with a single write to the database of a single record. With this approach, all of the serious problems related to OLTP disappear, as they all pertain to multi-record updates.

The record consists at the highest level of a map of key:value pairs. These key:value pairs are analogous to the columns in a relational database, which are also known as attributes, with the keys representing the column headings and the values representing the row's values for each column. To implement the hierarchical structure of the record, the values in the high-level key:value pair map are not limited to scalars or primitive types. They may themselves be maps, arrays (lists), or other structures. The described embodiment supports arrays and maps, which may be nested to any desired level of complexity.

Data within records is stored in the form of plain text, i.e., character strings, delimited with curly brackets, square brackets, single quote marks and the equals sign character (=). Each map, including the high level map that represents the entire document, is enclosed in curly braces. Within this map, keys are represented as strings of characters which may not contain any spaces or punctuation marks other than the underscore character. The key is followed by an equals sign character. If the value of this key:value pair is a scalar, the character string representing that scalar follows, enclosed in single quote marks (any single quote marks that occur within a scalar are set off by preceding them with a backslash character, and any backslash characters that occur are set off by replacing them with two backslash characters). Thus a record with a single key:value pair might look like this:

{name='John Doe'}

Additional key:value pairs follow in sequence. (Commas and spaces are optional between values and keys, and are added in the illustrations here merely for clarity.) The current embodiment keeps key:value pairs sorted, so a record with three key:value pairs might look like this:

{address='123 Main Street', city='Boston, Mass.', name='John Doe'}

A value may be a map or an array. An array is surrounded in square brackets, and a map is surrounded in curly brackets. A common and useful structure is an array of maps:

{details=[{detail map}, {detail map2}, {detail map3}, . . .]}

An invoice record, for example, might contain a key:value pair called "details" which would contain an array of maps, one map for each line item, with each of these maps representing all of the details of a single line item (part number, quantity, price, etc).

Maps within records and maps within arrays within records (as illustrated above) can be indexed. This kind of index is called a drill-down index. The 'details' subrecords in the table 'invoices' can thus be indexed and made to appear as a separate table, indexed by product number. To the outside world, for example to an SQL statement, the name of the table would be multipart with a period separating the parts, e.g.:

SELECT quantity, price FROM invoice.details
WHERE product_number . . .

In the described embodiment, the sequence of key:value pairs in records is ordered by key. However, this is not a requirement. It is simply a convenience that makes comparing two records for equivalence more efficient. It also makes the manual editing of records easier. Note that since some keys may be omitted in some records, the ordinal position of a given key may be different in different records.

A typical SQL relational database assumes a fixed rectilinear structure where the columns are well defined and do not change. Every record has an instance of every column, and nothing else. It is often convenient to organize information this way. So, if desired, the above-described record structure allows the application to maintain consistency from row to row with regards to keys used. But this is not a strict requirement.

In the real world, applications evolve and have a very long life span. E-mail addresses and cell-phone numbers came into common use long after many legacy applications were written. In order for an application to adapt, it must allow "columns" (attributes) to be added to or removed from tables quite liberally, and without causing a great deal of disruption to existing applications and data. So, as the application evolves, new attributes may be introduced which appear in new document records but not in old document records. And similarly, old attributes may be omitted from new records. An application that permits this flexibility allows the database to evolve over time without having to alter existing data. The above-described record structure allows the application to handle records as maps and allows it to freely add new key:value pairs to those maps.

The Append-Only Storage Model

In the described embodiment, each logical transaction is encapsulated in a single record, though this is not a strict requirement. When transactions are encapsulated in this way, processing a transaction is equivalent to updating a record.

Figure 3:
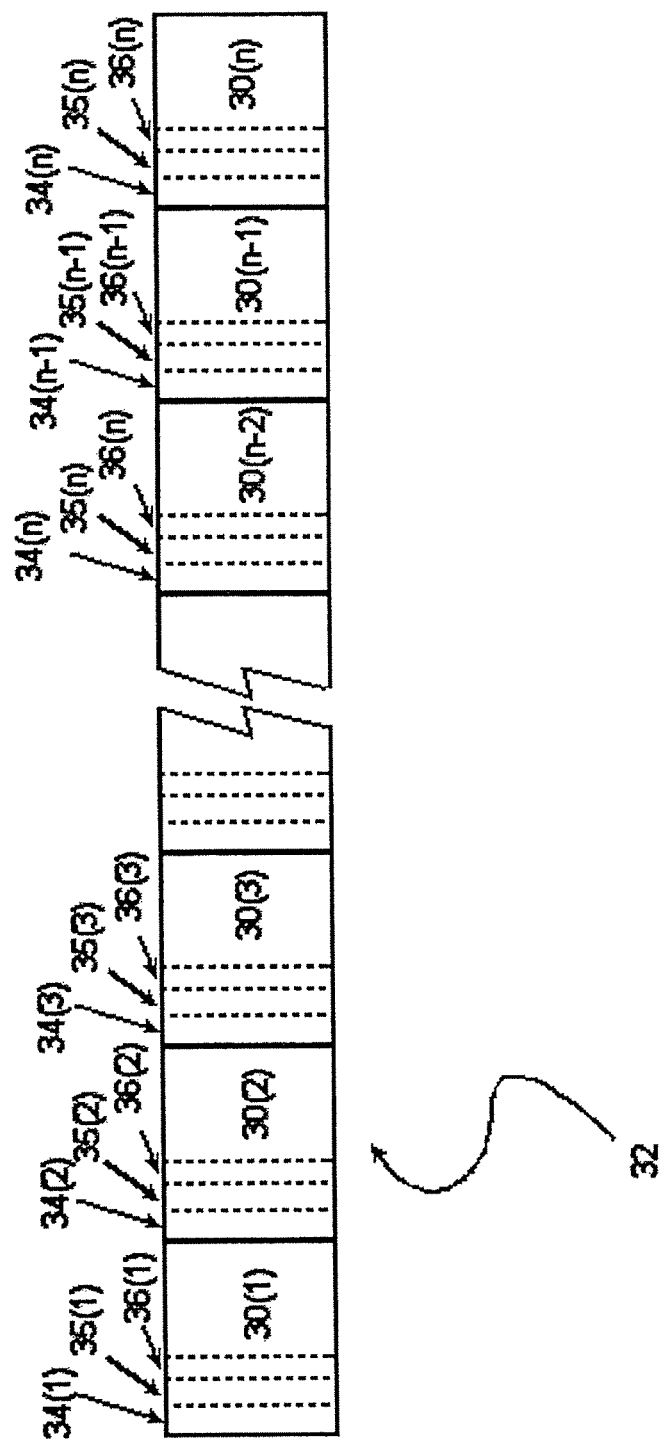
FIG. 3 illustrates a time-addressed database application file in which record versions identified by time stamps and primary keys are stored.
Figure 4:
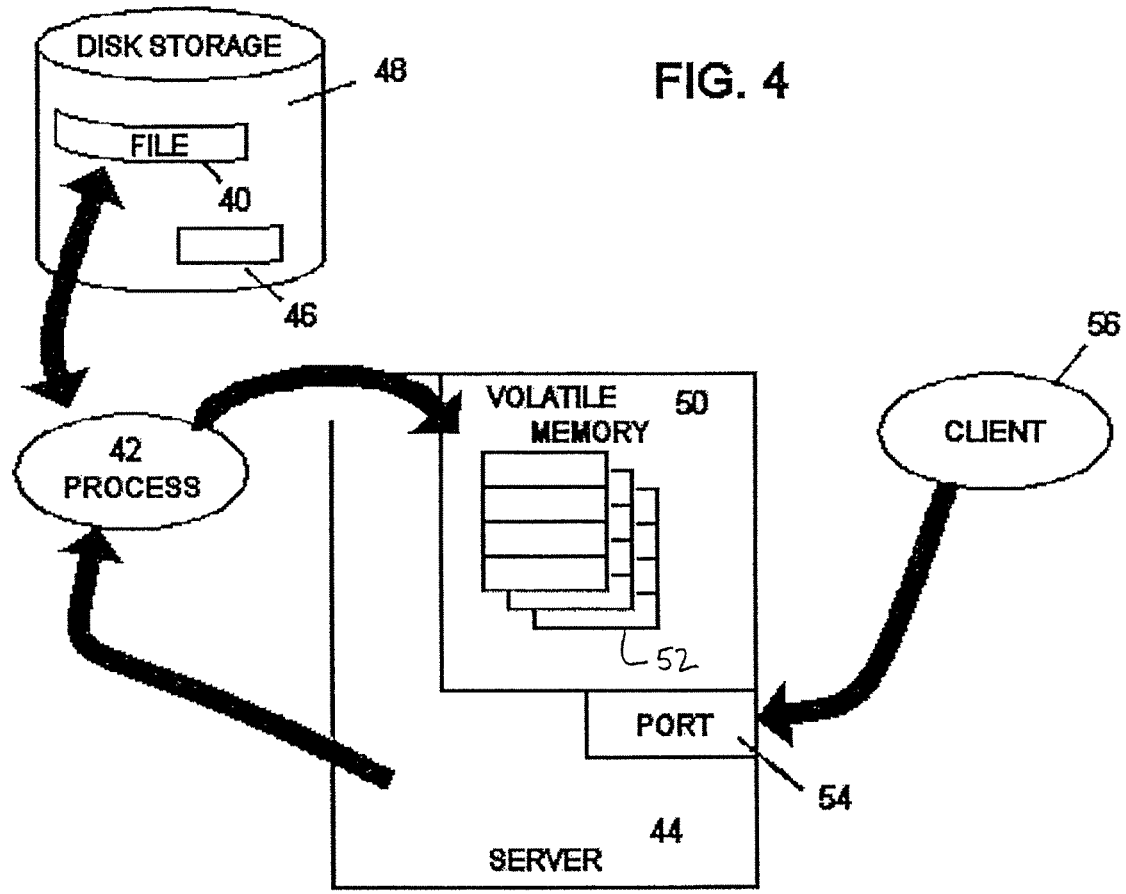
FIG. 4 illustrates a time-addressed database system that uses drill-down indexes for accessing records and sub-records within a database file.

Referring to FIG. 4, in the described embodiment the process 42 appends all updates to any given file (i.e., all new or modified versions of records) to the end of the corresponding file 40 in the operating system's underlying file system. Thus, referring to FIG. 3, all record versions, (and therefore, for the described embodiment, all transactions) 30(1)... 30(n), are sequentially and chronologically arranged within the corresponding file 32, which could potentially be very large.

Typically, in response to a user-initiated command or user input indicating that the user is finished with the transaction and wants to enter it, the client 56 submits the transaction record, the transaction record's primary key and a delete true/false flag to server 44 and process 42 adds a timestamp 34 to this information and writes this information as record 30(n) out to the end of file 32. The application may have some kind of check-and-balance feature that prevents the record from being submitted by the client 56 to the server 44 until the record is complete and the user has properly added all information that is required for that particular transaction. When the process 42 writes the record to the file, it adds the time stamp 34 to the beginning of the record identifying the time at which the transaction was stored. In the described embodiment, the time stamp is a string of digits which is an ASCII representation of the current time in universal time coordinates. This is followed by the record's primary key 35, the deletion flag 36 which is coded as the character "1" if the record is deleted and "0" if it is not, and then the text representation of the transaction record itself. The combined record 30 is terminated by a linefeed character. If any line feed characters occur in the record they are replaced by the C-language escape sequence '\n' on output to the database and converted back into linefeed characters on input from the database. The same procedure is applied to some other characters, such as the null and carriage return characters ('\0' and '\r'), to prevent the underlying file system and language processors from misinterpreting them.

Appending updates to the end of the file is the simplest and most portable approach. But alternative, more complex space allocations may be employed instead. But these alternative approaches must obey the requirements that no previous version of any record may be overwritten or altered and all new versions are added to the database and the entry sequence of the records must be maintained. As one example of an alternative approach, clustering could be employed to improve performance, provided that the sequence of the versions of any given record be maintained.

Clustering works by physically storing records in order by some key so that one disk I/O operation will retrieve several records that are likely to be accessed in rapid sequence. Many conventional systems cluster records dynamically by storing them in a tree structure, the leaves of which contain records which are inserted in key sequence. This requires a lot of record shuffling, node splitting, etc. which hurts performance when records are inserted. However, if reads far outnumber inserts, there is a gain in overall performance. In this case, record insertion is just a special kind of space management.

However, if clustering is employed, it need not be done dynamically. Instead, files can be clustered off-line by reading the records in key sequence and writing them to a new copy of the file in that sequence. In practice, off-line clustering works nearly as well as dynamic clustering in terms of improved read performance, but it has none of the negative impact of clustering on write performance.

The importance of clustering, however, diminishes as the amount of RAM available for buffering increases. RAM is so inexpensive today that it may make more sense to buy more RAM than to worry about clustering.

Drill-Down Indexes

In the file system described above, information about a given key (e.g. product) is not neatly organized into some table. Rather, it is scattered throughout what may be a very large file. In order to access that information, the drill-down indexes are used. The drill-down indexes are based on key: value pairs (e.g. product attributes) in that file. In a C++ program they can be easily and simply implemented by a tree, which maintains all of the keys in sequential order.

The record pointer in a drill-down index is an exact offset from the beginning of the file identifying where one can go to physically extract the sub-record containing the information for the particular indexed key. The index does not know the offset of the parent record in which the sub-record is contained. Because of this, sub-record extraction is transparent to the parent record's structure and content. The drill-down index key is multi-part, however, and one part is always the parent record's primary key. This primary key is delimited in such a way that the application can easily find and extract said primary key and can then retrieve the parent record.

All alternate indexes, including drill-down indexes, can be multi-part, and those parts can be extracted from any part of the sub-record. Thus, for example, a drill-down index for inventory transaction sub-records stored in a transaction file can be made up of product primary key, ship date and invoice number. These keys can be processed in sequence to extract all information for a given product and a given date range.

Using this index, one could find all transactions associated with a particular product or particular products in time sequence or in any way one wants. For example, one could ask to see history of a certain product that could have been affected by many transactions that are scattered all over the file. The drill-down index would enable the database application to present them in sequential order. The database application would provide a function call that enables the user to walk through the relevant records one at a time as though they were in a large, sorted list. In that way, the user can create a view [that] is a list of all of these products presented in a neat ordered fashion.

Referring to FIG. 4, each database file 40 is served by its own server process 42 that runs on server 44. When this process is started, it reads a user-maintained index control file 46 from non-volatile storage (e.g. disk storage 48). The index control file identifies all of the indexes including drill-down indexes that need to be constructed and maintained for that application. The primary key, which identifies the record within the file (e.g. invoice #, transaction #, or document #), is always indexed. In the case of a customer file, for example, the primary key would typically be a unique number assigned to each customer, which would have no external meaning. To make customer look-up efficient at least one alternate index, based on name, email, or some other well-known piece of information, could be maintained. The index control file will identify these and typically many other alternate indexes and drill-down indexes that will be needed to extract relevant information from the record for that particular database application.

Using the information found in the index control file, the server process builds in volatile memory 50 a table of indexes 52. It does this by sequentially scanning all of the records in the relevant database file 40 stored in disk storage 48 and builds all of the required indexes 52 from the information that it finds in the records.

From then on, every time that a record is created or modified, the server process scans through the record looking for the attributes that pertain to information that is to be indexed (e.g. line items in an invoicing system). Every time a sub-record is found, the application looks within that sub-record for attributes that are to be indexed (e.g. look within the line items to find product numbers and dates according to the keys that were assigned to those attributes). The process concatenates the alternate keys together with delimiters and the record's primary key to form multi-part keys. And the program simply adds those keys to internal indexes that are being maintained in volatile memory or, if the required indice already exists, updates its list of boolean indicators to indicate which new version now also contains the alternate key.

Since all of the indexes are in volatile memory if the system is ever shut down or needs to be restarted, these indexes will need to be rebuilt. However, since the process for building them is straightforward and simply involves a sequential read through each data file in the database the process can be done relatively quickly.

Locks

In the described embodiment, each record is isolated by using a simple, single-record exclusion lock and it is written and updated atomically. All applications that depend on data generated by the recorded transactions can derive that data from the documents by way of the drill down indexes. Thus, all transactions are isolated and made atomic without the need for "transaction processing" software.

As noted, record locking is implemented with mutual exclusion locks (mutex). When an application program attempts to read a record that it intends to update, it uses a call that checks to see if any other user has already locked the record. If so, the application program detects this condition and takes alternate action, such as suggesting to the user that they try wait a while before trying again. If not, the mutex is set and the application proceeds. The lock is released when the application program updates the record, unless they use an update call that retains the lock, or when it explicitly releases the lock. Locks may also be assigned timeouts, after which they unlock automatically. In addition, because the database is time-addressed, read-only locks are not necessary because sensitive read operations are made consistent by use of time addressing.

Note that the locks operate on the record level; they are not applied at the sub-record level. One cannot modify a sub-record within a locked record.

Referring again to FIG. 4, in the described embodiment, the database server is embodied as a computer program written in C++. An instance of this program listens for client connections on a known TCP/IP port 54. Clients 56 make database requests through this port. The program creates child processes 42 to handle individual files and refers clients 56 to those processes for further file-specific database services. Thus, each file is served by a separate process, and all operations on a given file are performed atomically. The process that serves that file maintains all indexes for that table. By having a single server process for each file and by performing all operations on the file atomically, the process can guarantee that no two users are reading or updating the file at the same time, and by using the mutex locks, the process can guarantee that no two or more users will be overlapping updates to the same records within that file.

To identify the particular records that are of interest, the client might set a global variable with the time address that is desired and whenever anything is requested from the database, this global variable can be specified as a parameter. If the client and server processes are running on different machines, it is possible that there might be a difference in time clocks. So, some procedure may need to be used to synchronize the two clocks. For example, one process could ask for the time of the other process.

Automated Summary Buckets

Most practical database applications depend heavily on "summary buckets". An example of a summary bucket would be the quantity on hand of a given product at a given location. The details of how that quantity was arrived at are buried in transactions, starting with a "starting inventory" count of the item at some point in time, followed by all the product movement transactions for that item (shipments, receipts, etc). The sum of these transactions is the current quantity on hand for the item, namely, a "summary bucket" whose value changes each time a quantity of the product is moved to or from its storage location. Because the number of transactions that affect a product's movement may be very large, it is impractical to retrieve all of the transactions and add them all up every time one needs to know the current quantity on hand of a particular product.

The traditional solution to this requirement is to have each application program that processes transactions against products read and update summary buckets that are stored in the database. Thus, for each product and location, there would be a record in the database that would contain a numeric attribute representing that product's quantity on hand at that location. The application would read the record with an exclusive update lock, change the attribute, and update the record. For an invoice with five line items, this would be five reads, locks, and updates.

Although it is possible to encapsulate all of the details of a transaction in a single document, it is not possible to also encapsulate the summary buckets in the same document.

The database automatically maintains virtual summary buckets as follows. Whenever a record is added to the database or updated, the server scans the new version, which might be a new record with no previous versions, for instances of attributes that match the summary bucket definitions for that file, extracts the quantities involved, and adds them to the buckets stored in the summary bucket indexes. The application then checks to see if a previous version for that record exists, and, if so, reads that version and reverses (e.g. subtracts from the summary bucket) any quantities found in that version.

Figure 5:
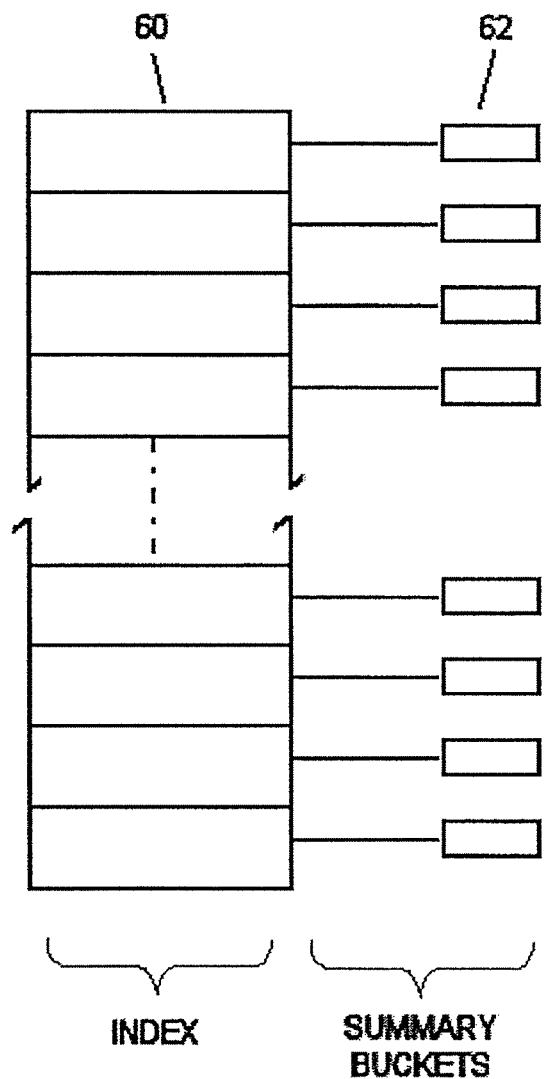
FIG. 5 illustrates a virtual summary bucket index.

The described embodiment eliminates the need for application-level summary bucket maintenance in the database by automatically maintaining virtual summary buckets. The collection of virtual summary buckets is like a drill-down index. The user defines a multi-part key for which the summary information is to be maintained. The multi-part key could, for example, consist of a product primary key and date and this is used as a drill-down summary bucket index 60 into the transaction file (see FIG. 5). The application then automatically maintains one internal summary bucket 62 for each combination of product primary key and date.

For example, if an inventory sub-record in an invoice transaction contained a quantity of "−10" (negative ten) in the "quantity changed" attribute, this would mean that a quantity of 10 of that item was removed from inventory and delivered to this customer on the relevant date. The server would perform the following steps. It would discover that this sub-record was indexed as a summary bucket, extract the record's product id and date attributes, access that summary bucket in memory, and add −10 (i.e. subtract 10) to the current value of the summary bucket. The server would check if a prior version of the record exists. If a prior version exists, the server extracts the quantity from that prior version and subtracts it from the summary bucket, thereby keeping the summary bucket "current."

The essence of a summary bucket is that it is like a total or subtotal that might appear on a report that sorts information in a file and prints totals or subtotals of numeric columns. The database server maintains these summary buckets by applying every change that affects them as they occur. Obviously, summary buckets apply only to numeric attributes, but they may be used for dollar amounts as well as other quantities; e.g. G/L account balances, A/R account balances, etc. Thus, instead of maintaining a physical file containing G/L amounts for each G/L account, the system merely stores a chart of accounts and a set of transaction details. The server sums the transaction details by account to give current balances, and by account and date to give daily summaries.

Other embodiments are within the following claims.

What is claimed is:

1. A method of constructing a transaction database for a transaction processing application, the method comprising the steps of:
for each of a plurality of separate, complete transactions,
  (a) receiving input for that transaction from a corresponding user via the transaction processing application;
  (b) responsive to receiving input from the corresponding user for that transaction, constructing a corresponding hierarchically-structured transaction record for that transaction that embodies all of the input received for that transaction; and
  (c) appending a time address to the corresponding hierarchically-structured transaction record for that transaction, with the time address indicating when the corresponding transaction was completed and concatenatedly storing the corresponding hierarchically-structured transaction record for that transaction in a non-volatile data storage, with concatenatedly storing the corresponding hierarchically-structured transaction record at least involving appending to the corresponding hierarchically-structured transaction record a time address that identifies when the corresponding record was stored, with the time address for the corresponding hierarchically-structured transaction record being permanently associated with each concatenatedly stored corresponding hierarchically-structured transaction record, and with the transaction processing application during normal operation preventing any overwriting of the concatenatedly stored corresponding hierarchically-structured transaction record with any other data that is entered for any of the plurality of transactions that are processed subsequent to completing that transaction,
wherein for each of a plurality of transactions, there is at least a key structure including a primary key with the corresponding hierarchically-structured transaction record concatenated with an alternative key.

2. The method of claim 1, wherein for all transactions handled by the transaction processing application, concatenatedly storing the corresponding hierarchically-structured transaction record includes concatenatedly adding that corresponding hierarchically-structured transaction record to a single common accounting transaction file in the non-volatile data storage.

3. The method of claim 1 wherein for all transactions handled by the transaction processing application, concatenatedly storing the corresponding hierarchically-structured transaction record includes concatenatedly appending that corresponding transaction record to the end of a single common file in the non-volatile data storage.

4. The method of claim 1 further comprising responding to a command to delete a particular one of the concatenatedly stored transaction records by:
generating a new version of the stored transaction record;
flagging the new version of the stored transaction record as deleted; and
concatenatedly storing the new version of the stored transaction record in the non-volatile data storage while continuing to leave the particular transaction record in the non-volatile data storage, with storing the new version of the stored transaction record including appending to the new version of the corresponding hierarchically-structured stored transaction record a new time address that identifies when the new version of the stored corresponding hierarchically-structured transaction record was concatenatedly stored.

5. The method of claim 1 further comprising generating a plurality of indexes to information that is within the concatenatedly stored transaction records.

6. The method of claim 1 further comprising generating and maintaining in volatile memory a plurality of indexes to information that is within the concatenatedly stored transaction records.

7. The method of claim 6, wherein each of the plurality of indexes includes two levels, the second level of which contains the time addresses that are within the concatenatedly stored transaction records.

8. The method of claim 1, wherein each corresponding hierarchically-structured transaction record contains sub-records.

9. The method of claim 1, wherein concatenatedly storing the corresponding hierarchically-structured transaction records for the plurality of transactions involves concatenatedly appending such transaction records in a common file.

10. The method of claim 1, wherein the plurality of corresponding hierarchically-structured transaction records include being sequentially and chronologically arranged within the common file by time address.

11. The method of claim 1, wherein any transaction that is processed by the transaction processing application includes represented by a single corresponding hierarchically-structured transaction record.

12. The method of claim 1, wherein for all transactions handled by the transaction processing application, concatenatedly storing the corresponding hierarchically-structured transaction record includes concatenatedly appending that corresponding hierarchically-structured transaction record to the end of a single common file in the non-volatile data storage so that transaction records within that single common file are arranged chronologically.

* * * * *